A. J. DOTY.
VEHICLE STRUCTURE.
APPLICATION FILED JULY 8, 1914.
1,204,549. Patented Nov. 14, 1916.
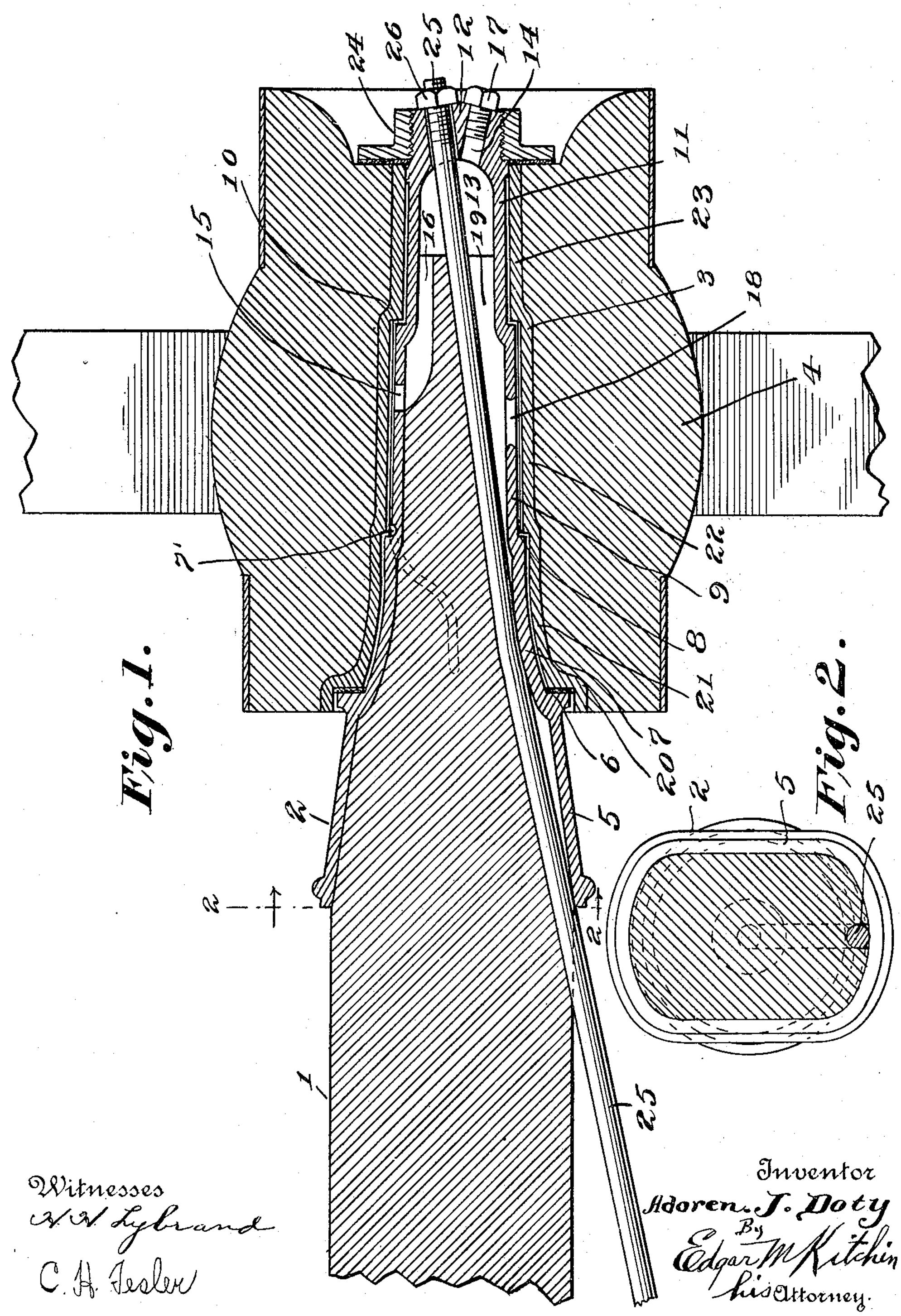
Witnesses
H. H. Lybrand
C. H. Tesler
Inventor
Adoren J. Doty
By Edgar M. Kitchin
his Attorney.
THE NORRIS PETERS CO., PHOTO LITHO., WASHINGTON, D. C.

UNITED STATES PATENT OFFICE.

ADOREN JAY DOTY, OF HARBOR SPRINGS, MICHIGAN.

VEHICLE STRUCTURE.

1,204,549. Specification of Letters Patent. Patented Nov. 14, 1916.

Application filed July 8, 1914. Serial No. 849,697.

*To all whom it may concern:*

Be it known that I, Adoren Jay Doty, a citizen of the United States, residing at Harbor Springs, in the county of Emmet and State of Michigan, have invented certain new and useful Improvements in Vehicle Structures; and I do hereby declare the following to be a full, clear, and exact description of the invention, such as will enable others skilled in the art to which it appertains to make and use the same.

This invention relates to improvements in vehicle structures, and more particularly to the axle skeins thereof.

An object in view is the production of an improved skein adapted to largely eliminate friction and to effectively distribute lateral stresses.

A more detail object is the formation of the skein in a manner adapting it to present a substantially horizontal supporting surface while bodily tilted so as to take up end-thrust strains and to deliver the same as a radial stress to the wheel.

With these and further objects in view, as will in part be hereinafter stated and in part become apparent, the invention comprises certain novel constructions, combinations and arrangements of parts as hereinafter specified and claimed.

In the accompanying drawing,—Figure 1 is a vertical section through a hub and fragment of axle having applied thereto an embodiment of the invention. Fig. 2 is a transverse section, taken on the plane indicated by line 2—2 of Fig. 1.

Referring to the drawing by numerals, 1 indicates a wooden or like axle having at each end a skein 2 forming the journal for the boxing 3 of hub 4. The skein 2 consists of a sleeve 5 terminating in an annular shoulder 6 merging into a longitudinally, relatively abruptly curved, conical portion 7 which blends into a cylindrical portion and terminates in a shoulder 8 merging into a section 9 which tapers slightly outwardly, and the section 9 in turn terminates with a shoulder 10 merging into a terminal section 11 which also tapers outwardly. Thus it will be seen that the longitudinal axis of the body of the skein (that is the sections 7, 9 and 11) is on a right line with the corresponding axis of sleeve 2, there being no vertical offset of the sleeve. The entire skein is hollow or tubular for receiving the axle 1 which is reduced successively in diameter proportionally to the several sections of the skein so as to snugly fit therein, the axle terminating in the length of the section 11, and said section being closed at its outer end by a preferably integral filling 12 and thus producing a lubricant container 13. The filling 12 is formed with a bore 14 leading into the container 13 and preferably closed by a threaded plug 17.

The section 9 is formed at its upper portion with an aperture 15, and a passageway or port 16 leads from aperture 15 along and within the axle 1 to the chamber 13 for enabling the discharge of lubricant from the container or chamber 13 through the aperture 15 into the upper grease groove seen extending longitudinally of the skein in Fig. 1, for reducing friction between the boxing and skein. This lubricant groove may be omitted and the grease allowed to work its way between the bearings if desired. A truss-rod receiving groove 19 is formed in the under portion of the axle and affords communication between chamber 13 and aperture 18 formed in the lower portion of the skein and opening into the longitudinal grease groove seen in Fig. 1, which may also be omitted like the upper grease groove. Preferably only thick wagon grease is employed, but obviously other lubricants may be used as desired.

The boxing 3 is provided with an annular sand guard 20 surrounding the shoulder at the outer end of the sleeve 2 and is provided with a conical section 21 corresponding in longitudinal curvature to the curvature of section 7, so that section 21 is bell-shaped and converges outwardly to a point somewhat in rear of shoulder 8 and extends thence outwardly as a cylinder, the outer portion of section 7 being cylindrical. This formation of the skein and boxing is very important in that it provides for causing the section 7 to lie with the lowermost longitudinal line of its curved portion substantially horizontal when the wheel is tilted laterally as when the axle 1 is inclined from the horizontal by virtue of the wheel at one end of the axle riding on a higher plane than the wheel at the other end of the axle, as when the wagon is moving along the side of a hill. When the axle is thus inclined there is a natural tendency toward end thrust against the lower wheel which pushes outwardly on the spokes, but with the improved skein having the conical portion of section 7 and the coöperating boxing section 21, the strain is delivered largely as a vertical stress, and the end thrust is thus taken up with a minimum amount of lateral pressure on the shoulders of the skein, this being due to the fact that the curvature of the sections 7 and 21 is such as to cause these sections to have the lowermost line of their conical portions lie substantially horizontally when the axle 1 is tilted. At other times the section 11 which has a coöperating conical section 23 in the boxing transmits the load as a vertical, radial stress, since the abruptly conical portions of sections 7 and 21 cause the shoulders of the boxing to tend to be forced away from the shoulders of the skein. Section 9 has a coöperating section 22, but the former as seen in Fig. 1 preferably is of sufficiently less diameter than the latter for insuring distribution of grease with little or no bearing between these sections. The outer end of section 11 is externally threaded and engaged by a nut 24 which is of the type usually employed for preventing lateral dislocation of the wheel from the axle.

A truss rod 25 extends through the filling 12 and on an incline longitudinally throughout the skein 2, extending in slot 19 and past the usual strut or struts, not illustrated, and thence to the other end of the axle in the same form as seen in Fig. 1. Each end of rod 25 is threaded and engaged by a nut 26 which bears against the respective filling 12, whereby the rod 25 is held in place and may be tensioned. A partly spiral groove 7′ leads from shoulder 8 to sand-guard 6 for insuring delivery of grease thereto.

What I claim is:—

1. A skein having a series of sections of varying diameters having shoulders merging them together, the skein having an interior lubricant chamber, and a port leading therefrom through one of the sections spaced at an intermediate point between the shoulders, and the skein being formed with a distributing groove leading from one of the shoulders of the last named section in a general axial direction along the surface of the adjacent section.

2. A skein comprising a sleeve, a relatively short incurved tapered section fixed to the sleeve and outstanding therefrom, a reduced cylindrical section extending outwardly from the first mentioned section and connected therewith by a shoulder and a further section of less diameter than the said cylindrical section connected with the outer end of the cylindrical section with a shoulder, said further section being formed with an interior oil chamber and an exit being provided from said chamber to the exterior of the second mentioned section.

3. A skein comprising a sleeve, a relatively short incurved tapered section fixed to the sleeve and outstanding therefrom, a reduced cylindrical section extending outwardly from the first mentioned section and connected therewith by a shoulder and a further section of less diameter than the said cylindrical section connected with the outer end of the cylindrical section with a shoulder, said further section being formed with an interior oil chamber and an exit being provided from said chamber to the exterior of the second mentioned section, and means of distribution of lubricant from said section.

4. The combination, with an axle, of a skein surrounding the end portion thereof and comprising a series of sections, each terminating in an annular shoulder which merges into the next succeeding sections, the sections being formed with lubricant-distributing grooves communicating past the shoulders, and the axle terminating short of the outermost section for leaving a lubricant container in said section, said outermost section having a filler closing its outer end, the filler being formed with an opening enabling access to the container from the exterior, the skein and hub being formed with apertures and passageways for the exit of lubricant from the container to the exterior surface of the skein.

In testimony whereof I affix my signature.

ADOREN JAY DOTY.

Copies of this patent may be obtained for five cents each, by addressing the "Commissioner of Patents, Washington, D. C."